United States Patent
Littau

[15] 3,685,264
[45] Aug. 22, 1972

[54] ARTICULATED FRAME FOR DOUBLE ROW AGRICULTURAL HARVESTER

[72] Inventor: Eugene G. Littau, 942 S. Fir St., Salem, Oreg. 97302

[22] Filed: Dec. 21, 1970
[21] Appl. No.: 99,777

[52] U.S. Cl..................................56/209, 56/234
[51] Int. Cl..................................A01d 67/00
[58] Field of Search........56/6, 7, 503, 236, 209, 234, 56/235, 236

[56] References Cited

UNITED STATES PATENTS

| | | | |
|---|---|---|---|
| 2,725,703 | 12/1955 | Roseman | 56/7 |
| 3,410,063 | 11/1968 | Speiser | 56/7 |

*Primary Examiner*—Antonio F. Guida
*Attorney*—Kolisch & Hartwell

[57] ABSTRACT

A dual-row agricultural row crop harvester including a floating articulated frame structure for carrying harvesting apparatus, and for accommodating irregularities in row-spacing and field terrain as the harvester travels over a field. The articulated structure includes: a vertically shiftable subframe mounted on an end of the main frame in a vehicle, such as a tractor; a laterally extending elongated rock frame pivoted to the subframe for rocking about a rock axis generally paralleling the travel direction of the vehicle; and on each end of the rock frame, a depending, swingable outrigger frame mounted for swinging about an axis substantially paralleling the rock axis.

5 Claims, 3 Drawing Figures

PATENTED AUG 22 1972

3,685,264

Eugene G. Littau
INVENTOR
BY
Kolisch & Hartwell
Attys.

ARTICULATED FRAME FOR DOUBLE ROW AGRICULTURAL HARVESTER

BACKGROUND OF THE INVENTION

This invention pertains to automated agricultural harvesting equipment, and more particularly to a novel articulated frame structure for use in such equipment to a novel articulated frame structure for use in such equipment to facilitate harvesting of produce from row crops. For the purpose of illustration, a preferred embodiment of the invention is described herein in conjunction with the harvest of fruit berries, such as blackberries.

In recent years, and for many reasons, there has been an increasing interest in the development of automated agricultural equipment. For example, the harvesting of produce, such as blackberries, has presented a number of problems in the past, since it has been primarily a hand operation. Attempts heretofore to devise automated equipment for machine-picking such berries, whose plants are typically distributed in spaced, parallel rows across a field, have not been entirely satisfactory. Quite apart from the problems of properly dislodging and capturing ripe fruit from such a plant, there is the problem of maintaining proper relative positioning between harvesting apparatus on a traveling picking or harvesting machine and the plants in a row. While this is less of a problem in the case of a machine adapted to handle only a single row in a given pass across a field, than it is in the case of a double row machine, single row machines are often considered less desirable to use (since they take nearly twice as long to cover a given field as a double row machine, yet ordinarily cost quite a bit more than half the price of a double row machine).

Thus, there is a need for a double row harvesting machine for handling crops, such as that indicated, which is capable of maintaining its plant-engaging parts properly positioned relative to plants in adjacent rows in a field. More particularly, there is a need for such a machine which, while traveling over a field can readily accommodate irregularities in row-spacing and in terrain. In other words, it is desirable that such a machine be able to take care of a situation where a pair of rows may vary somewhat in their spacing along their lengths, and also to take care of a situation where adjacent rows may be at somewhat different elevations at different points in a field.

A general object of the present invention, therefore, is to provide, in a harvesting machine of the type generally outlined, novel articulated frame structure which is for carrying harvesting apparatus in the machine and which takes care of the terrain and row-spacing irregularities, of the type mentioned above, in a satisfactory and practical manner.

Another object of the invention is to provide such a structure which is capable of adjusting to take care of the kinds of irregularities mentioned with little or no interference from the harvest machine operator.

Still another object of the invention is to provide articulated structure of the type generally described which can readily be incorporated in various types of ground-traveling agricultural vehicles to adapt the same for use as dual-row harvesters.

According to a preferred embodiment of the invention, the proposed frame structure comprises an elongated rock frame which is adapted to be mounted for pivotal movement adjacent one end of the main frame in a vehicle (such as a tractor), with the opposite ends of the rock frame extending toward laterally opposite sides of the vehicle. The rock frame has a length which is substantially equal to the mean spacing between the centers of adjacent rows of the particular crop from which produce is to be harvested. Suspended through pivot connections adjacent the opposite ends of the rock frame are two outrigger frames which carry the particular plant-engaging harvesting apparatus which is to be employed. The pivot connections provided for the outrigger frames substantially parallel the pivot axis provided for the rock frame, and all three of these pivot axes substantially parallel the direction in which the vehicle moves on traveling over a field.

With such construction, during a given harvesting or picking operation of the plants in a given pair of adjacent rows, the vehicle is driven substantially centrally down the space between the rows. The outrigger frames support the plant-engaging apparatus at proper locations relative to the plants in the two rows, whereby produce (such as blackberries) can be removed from the plants and collected. As the machine travels along the rows, should the row-spacing vary (i.e., widen or narrow), from what might be thought of as a mean or normal row-spacing, the outrigger frames swing about their pivot axes to accommodate this situation. Such rocking occurs automatically. Should the relative elevations of the two rows differ along their lengths, the rock frame adjusts to take care of this situation.

The swinging and rocking actions which thus automatically take place to accommodate variations both in row-spacing and in relative row elevation, may be thought of as resulting from a sort of floating action in the frame structure, which action is enabled by the facts that the rock and outrigger frames are each suspended and supported from above the ground. Such performance greatly minimizes the likelihood of plant damage, since, with this kind of performance permitted, it is in fact the relative positions of the plants which determine the particular configuration of the frame structure required to accommodate the plants.

To provide for still a further adjustment of the harvesting apparatus which is carried, it is contemplated that the rock frame is pivoted on yet another frame which is interposed between the rock frame and the main frame of the vehicle. This other frame which is called herein a subframe, is suitably mounted, as by a conventional three-point hitch arrangement, for vertical movement relative to the vehicle frame. The vertical position of this subframe, and hence of the rock and outrigger frames, may thus be further adjusted, if desired.

DESCRIPTION OF THE DRAWINGS

These and other objects and advantages attained by the invention will become more fully apparent as the description which follows is read in conjunction with the accompanying drawings, wherein.

DETAILED DESCRIPTION OF THE INVENTION

Figure 1:
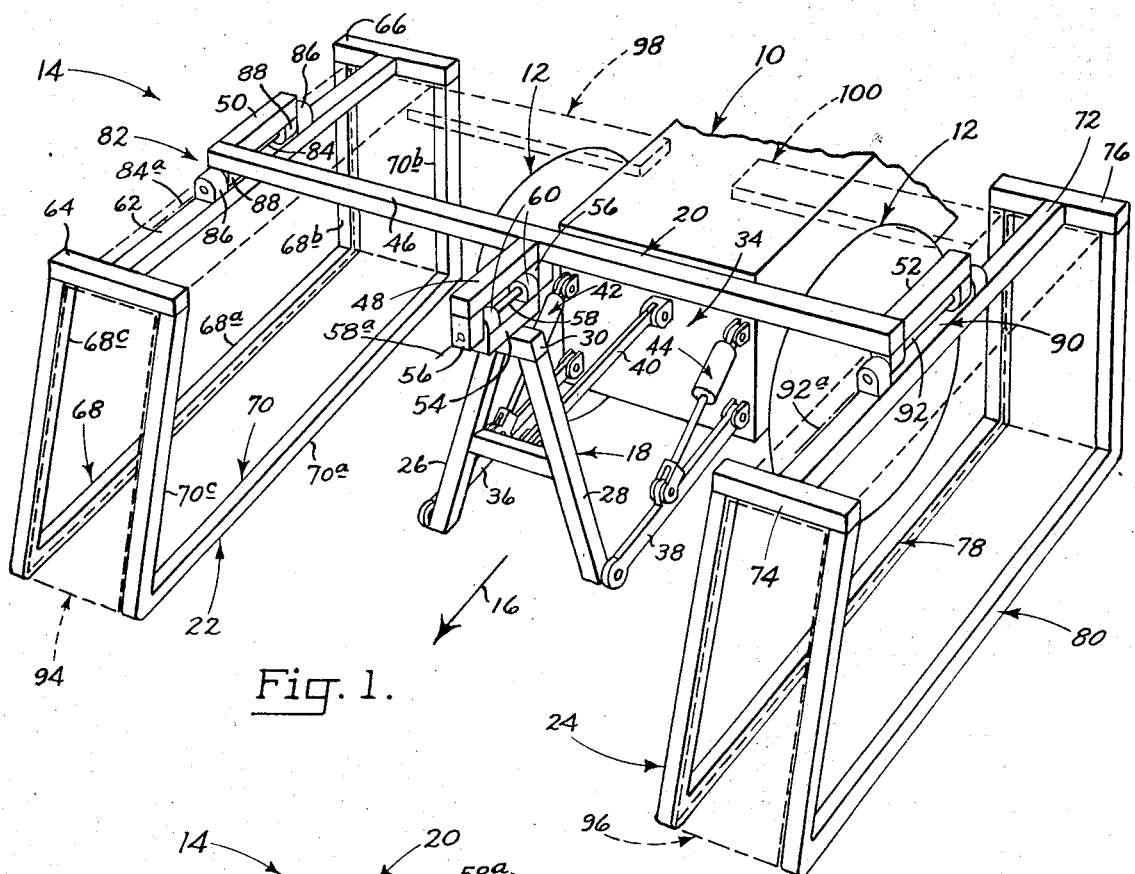
FIG. 1 is a perspective view illustrating an articulated structure constructed according to the invention mounted on one end of the frame of an agricultural vehicle, such as a tractor.

Turning now to the drawings, and referring first to FIG. 1, indicated generally in fragmentary block form at 10 is the rear end portion of the frame of a conventional agricultural vehicle, such as the rear end frame portion of a tractor. In order to simplify the drawings herein, and because of the familarity which those skilled in the art have with respect to the details of conventional tractor construction, no attempt has been made herein to illustrate details of the tractor and its frame. The rear end of frame 10 is supported for travel over the ground through the usual power-driven rear wheel assemblies, such as those shown at 12. Wheel assemblies 12 are nonsteerable—the tractor being turned or steered, when desired, through turning of its front wheel assemblies (not illustrated) which are, of course, steerable.

Mounted on the rear end of frame 10 according to the present invention is an articulated structure 14 which is adapted to carry harvesting apparatus for harvesting ripe produce from upstanding row crop plants, such as from black raspberry plants. In particular, and as contemplated herein, structure 14 adapts the tractor for use as a dual-row harvester for such a crop. As will be more fully explained, during a harvesting operation the tractor is driven in reverse, i.e., in the direction of arrow 16 in FIG. 1, between two rows of plants. This travel direction for the tractor is, of course, not critical, but has been found to be convenient where a tractor is employed as the vehicle that is adapted for use as a harvester.

In general terms, articulated structure 14 includes a centrally disposed vertically shiftable subframe 18, an elongated rock frame 20, and a pair of spaced-apart swingable outrigger frames 22, 24.

Subframe 18 has an A-shaped configuration, including upwardly converging legs 26, 28 which are joined together at their top ends through a cross member 30, and intermediate their top and bottom ends through a cross member 32. The legs and cross members in subframe 18 are preferably formed from welded-together pieces of hollow, rectangular cross-section steel.

Subframe 18 is mounted for vertical movement on the rear end of tractor frame 10 through a conventional three-point hitch mechanism indicated generally at 34. Such a hitch mechanism, of which there are many specific types, is conventionally provided on the rear end of the frames of most agricultural tractors, and this fact is one of the reasons why it is particularly convenient, where a tractor is employed to support structure 14, to drive the tractor in the reverse direction (as mentioned earlier).

The particular three-point hitch mechanism shown comprises three elongated rigid links 36, 38, 40 which pivotally interconnect frame 10 and subframe 18. Link 36 has its inner end pivoted to frame 10 and its outer end pivoted to the bottom end of leg 26. Link 38 substantially parallels link 36 and has its inner end pivoted to frame 10 and its outer end pivoted to the bottom of leg 28. Link 40 is substantially parallel to the other two links mentioned, and has its inner end pivoted to frame 10 and its outer end pivoted to cross member 32. The various pivot connections just mentioned, provide pivot axes that substantially parallel one another and which extend substantially transversely of and at right angles to the longitudinal axis of the tractor frame.

Operatively interposed between links 36, 38 and frame 10, and also forming part of mechanism 34, are hydraulic rams 42, 44. As can be seen, ram 42 interconnects frame 10 and link 36 and ram interconnects frame 10 and link 38. The cylinders in these rams are connected to a suitable source of hydraulic fluid under pressure, such as the hydraulic fluid source normally provided on an agricultural tractor. In particular, rams 42, 44 are connected for coordinated, like, simultaneous operation. With extension of the rams, links 36, 38, 40 swing downwardly about their inner pivot axes, with resultant lowering of subframe 18. With contraction of the rams, the reverse action takes place. With raising and lowering of subframe 18, it remains disposed in a substantially upright plane.

Rock frame 20 comprises an elongated central member 46 to which are joined, as by welding, a central mounting part 48, and end members 50, 52. Members 46, 50 52, and mounting part 48 are substantially coplanar and are formed of substantially the same hollow, rectangular cross-section material as that used in subframe 18. Central member 46 is substantially centered (laterally) relative to the longitudinal axis of the tractor frame, and extends toward and beyond laterally opposite sides of such frame (outwardly of wheel assemblies 12). Preferably, the overall length of member 46 is substantially the same as what might be thought of as the mean spacing of the rows of plants in the crop which is intended to be harvested. In the particular case being described herein, where the crop that is to be harvested comprises black raspberries, the rows of black raspberry plants have a mean (or normal) spacing of about 9 feet. Such a spacing is conventional, and is typical for many other types of row crops.

Mounting part 48 extends forwardly of central member 46, and is disposed with its longitudinal axis substantially paralleling the longitudinal axis of the tractor frame. The mounting part directly overlies a substantially parallel member 54 which is joined, as by welding, at substantially a right angle across the top of cross member 30 in subframe 18. Joined to the underside of the rock frame, adjacent opposite ends of member 48, are spaced-apart downwardly projecting brackets 56. The rock frame is pivoted on the subframe through an elongated shaft 58 which extends between and is mounted on brackets 56, and which is journaled in spaced-apart bearings 60 mounted as shown on member 54. The pivot axis, 58a, provided by shaft 58 substantially parallels the longitudinal axis of the tractor frame.

End members 50, 52 are substantially the same in construction, and project rearwardly of central member 46. Members 50, 52 are disposed with their longitudinal axes substantially paralleling that of mounting part 48.

Considering the constructions the constructions of outrigger frames 22, 24, these are substantially identical. Thus, and considering frame 22, it comprises an elongated central top member 62, to opposite ends of which are joined end members 64, 66. The longitudinal axes of end members 64, 66 substantially parallel one another, and are disposed at substantially a right angle to the longitudinal axis of member 62. Member 62 is disposed with its longitudinal axis substantially paralleling that of the tractor frame.

Joined to and depending from the opposite sets of ends of members 64, 66 are a pair of somewhat U-shaped parts 68, 70 which are substantially the same in construction. These parts include elongated central portions 68a, 70a and upwardly extending end portions 68b, 68c and 70b, 70c. Parts 68, 70 occupy substantially parallel spaced-apart upright planes. The central portions, 68a, 70a, of these parts substantially parallel member 62. End portions 68b, 70b are disposed at substantially right angles both to portions 68a, 70a, respectively, and to member 66 to which they are joined at their upper ends. Portions 68c, 70c are disposed at angles somewhat less than a right angle to portions 68a, 70a, respectively, and are joined at substantially right angles to the opposite ends of member 64.

As has already been mentioned, outrigger frame 24 is substantially the same in construction as frame 22, and includes members and parts 72, 74, 76, 78, 80, which correspond to members and parts 62, 64, 66, 68, 70, respectively. The various members and parts in the two outrigger frames are preferably formed of hollow, rectangular cross-section steel, such as that mentioned earlier.

Outrigger frame 22 is pivoted to end member 50 in rock frame 20 through a pivot assembly 82 which comprises an elongated shaft 84 and a pair of bearings 86. Shaft 84 extends between and is mounted on a pair of downwardly projecting brackets 88 secured adjacent opposite ends of the underside of member 50, and is journaled in bearings 88 which are anchored to the top of member 62. Shaft 84 provides a pivot axis 84a which substantially parallels previously mentioned axis 58a. Outrigger frame 24 is pivoted in a similar manner to member 52 through a pivot assembly 90 which is substantially the same in construction as pivot assembly 82. A shaft 92 in pivot assembly 90, which corresponds to shaft 84 in assembly 82, provides a pivot axis 92a which substantially parallel axes 58a, 84a.

The particular outrigger frames illustrated and described herein have been constructed to provide a suitable mounting framework for supporting one of the various types of plant-engaging harvesting apparatuses which is adapted to straddle the plants in a row. It is thus intended that with the particular outrigger frames provided, the depending somewhat U-shaped parts therein (parts 68, 70, 78, 80) will themselves straddle plants in a row. Those persons who are skilled in the art will appreciate that there are a number of available types of row-straddling plant-engaging harvesting apparatus, and accordingly, details of such an apparatus (which forms not part of the present invention) are not provided herein. Instead, a pair of such apparatuses are indicated simply in dashed block outline, generally at 94, 96, suitably mounted on the members and parts in swing frames 22, 24, respectively. These apparatuses may, for example, include: equipment for striking, shaking, or otherwise dislodging ripe berries from plants; means for gathering dislodged berries; and conveyor means for taking away gathered berries. Indicated generally at 98, 100, in simple dashed block outline are conventional conveyor mechanisms which are for receiving berries from apparatuses 94, 96, respectively, and for transporting such berries to a suitable receiving station on the frame of the tractor.

Figure 2:
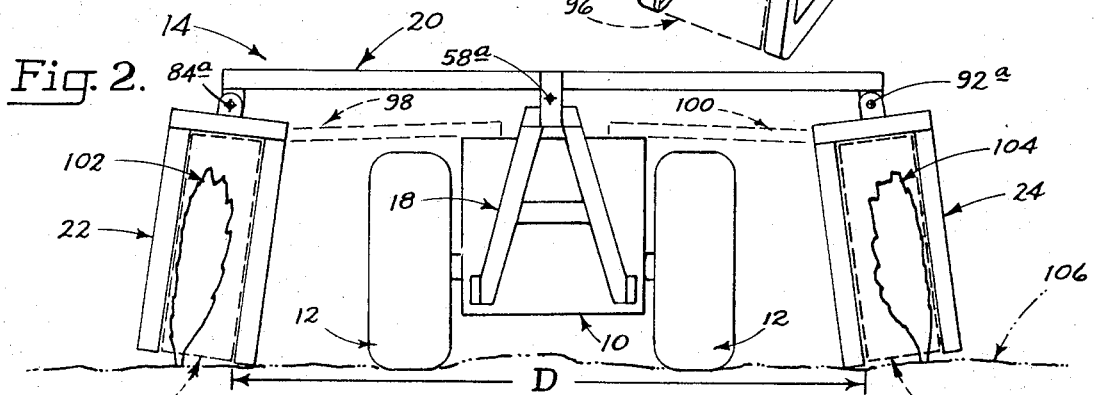
FIG. 2 is a reduced-scale front elevation of the articulated structure of FIG. 1, illustrating how a pair of outrigger frames in the structure swing to accommodate an overly wide spacing of row crop plants.

Explaining now how the equipment described herein performs, and referring to FIG. 2, this illustrates how the outrigger frames adjust automatically to take care of a situation where the row-spacing between a pair of rows deviates from the mean or normal spacing. As was mentioned earlier above, the mean or normal spacing for rows of black raspberry plants (in the present illustration) is about 9 feet. During a harvesting operation, the tractor is driven (in reverse) substantially centrally along and between adjacent rows, with structure 14 advancing along the rows in the direction of arrow 16 in FIG. 1 (and out of the plane of FIGS. 2 and 3). The outrigger frames, and the plant-engaging harvesting apparatus which they carry, straddle the rows, such as the rows of plants indicated generally at 102, 104 in FIG. 2. It will be noted that in FIG. 2, the ground, indicated generally at 106, is substantially level. The normal row spacing of about 9 feet is indicated by the distance D in FIG. 2.

It will be noted that at the particular point along rows 102, 104 illustrated in FIG. 2, the plants in these rows are spaced-apart considerably more (perhaps as 1½ to 2 feet) than the normal row-spacing. It will be noted also how outrigger frames 22, 24 have automatically taken care of this situation by having swung outwardly about pivot axes 84a, 92a, respectively, to enable continued performance of harvesting apparatuses 94, 96. From this specific illustration, it will be appreciated that as the equipment travels along the rows, the outrigger frames automatically adjust, by swinging outwardly or inwardly, together or alone, to take care of irregularities in row-spacing. No adjustment is required by the tractor operator.

Figure 3:
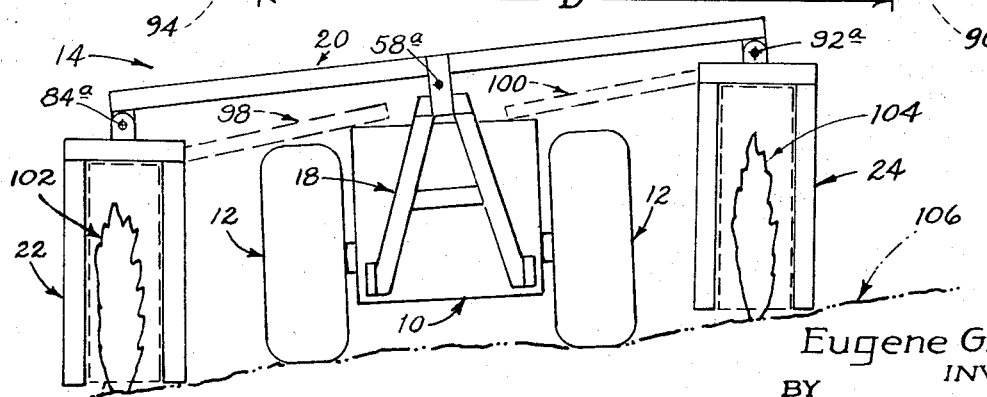
FIG. 3 is a view taken in the dame direction as FIG. 2, and on about the same scale, illustrating how the articulated structure adjusts to accommodate rows of plants which are at different elevations in a field.

FIG. 3 illustrates how structure 14 takes care of the situation where, at a particular point along rows 102, 104, ground 106 slopes downwardly from row 104 to row 102. It will be obvious from the illustration in FIG. 3 that the rock frame accommodates this situation by rocking automatically about axis 58a. This adjustment also takes place without any effort required of the tractor operator.

From the foregoing, it will be apparent that the articulated structure contemplated herein thus automatically takes care of irregularities in row-spacing and terrain which are commonly encountered in fields of row crops. Harvesting apparatus carried by such structure is thus maintained in a proper disposition for continuing a harvesting operation despite such irregularities.

With the rock and outrigger frames supported on vertically shiftable subframe 18, yet another adjustment can be made to assure a proper harvesting operation. This adjustment is one that is made by the tractor operator. Specifically, subframe 18 may be raised and lowered relative to the tractor frame to assure proper vertical positioning of the rock and outrigger frames relative to the ground. Ordinarily, once the articulated structure has been mounted on a particular vehicle, this adjustment need only be made once.

While a preferred embodiment of the invention has been described herein, it is appreciated that various changes and modification may be made to suit particular applications. For example, the exact configurations of the rock and outrigger frames, and of the subframe, may be changed to adapt the structure for mounting on different types of vehicles, and for carrying different types of harvesting apparatus. The particular length of the rock frame which is employed, of course, depends upon the mean spacing of the rows of plants which are to be harvested. If desired, the rock frame may be made with an adjustable rather than fixed length.

Thus, it is appreciated that variations and changes may be made in the invention without departing from its spirit.

It is claimed and desired to secure by letters patent:

1. A floating articulated structure for mounting on the frame of a ground-traveling agricultural vehicle to adapt the same for performance as a dual-row produce harvester for row crop plants, said articulated structure comprising
    an elongated rock frame having a length substantially equal to the expected mean spacing between the centers of adjacent rows of plants from which produce is to be harvested,
    pivot means for said rock frame disposed intermediate its opposite ends adapted to mount the rock frame for floating rocking movement relative to said vehicle frame about a generally horizontal rock axis that substantially parallels the line along which the vehicle travels, with opposite ends of the rock frame, with the latter so mounted, extending toward laterally opposite sides of the vehicle,
    for each end of said rock frame a floating swingable outrigger frame, and
    pivot means for each outrigger frame pivoting and suspending the same adjacent the associated end of said rock frame for swinging about a swing axis substantially paralleling said rock axis, with the outrigger frame depending from the rock frame.

2. The articulated structure of claim 1, which further comprises a generally vertically shiftable subframe disposed intermediate said rock frame and said vehicle frame, mounted on said vehicle frame for movement up and down relative thereto, and floatingly supporting said first-mentioned pivot means.

3. In an agricultural row-crop harvesting vehicle which is adapted to harvest produce simultaneously from plants in two adjacent rows in a field while moving over the field, said vehicle including a vehicle frame,
    a floating articulated structure for carrying harvesting apparatus, and for accommodating irregularities in row-spacing and in terrain with movement of the vehicle over a field, said articulated structure comprising
    an elongated rock frame having a length substantially equal to the expected means spacing between the centers of adjacent rows of plants from which produce is to be harvested,
    pivot means for said rock frame disposed intermediate its opposite ends adapted to mount the rock frame for floating rocking movement relative to said vehicle frame about a generally horizontal rock axis that substantially parallels the line along which the vehicle travels, with opposite ends of the rock frame, with the latter so mounted, extending toward laterally opposite sides of the vehicle,
    for each end of said rock frame a floating swingable outrigger frame, and
    pivot means for each outrigger frame pivoting and suspending the same adjacent the associated end of said rock frame for swinging about a swing axis substantially paralleling said rock axis, with the outrigger frame depending from the rock frame.

4. The vehicle of claim 3, wherein said articulated structure further comprises a generally vertically shiftable subframe interposed between said rock frame and said vehicle frame, mounted on the vehicle frame for movement up and down relative thereto, and floatingly supporting said first-mentioned pivot means.

5. In an agricultural vehicle for harvesting produce simultaneously from plants in two adjacent rows in a field while traveling thereover,
    an elongated vehicle frame supported for movement over the ground in a direction generally paralleling its longitudinal axis,
    a generally vertically shiftable subframe mounted on said vehicle frame adjacent one end of the latter for shifting up and down relative to the vehicle frame,
    an elongated rock frame having a length substantially equal to the expected mean spacing between the centers of adjacent rows of plants from which produce is to be harvested,
    pivot means for said rock frame disposed intermediate its opposite ends mounting the rock frame on said subframe for floating rocking movement about a generally horizontal rock axis which substantially parallels the longitudinal axis of said vehicle frame, with opposite ends of the rock frame, with the latter so mounted, extending toward laterally opposite sides of the vehicle,
    for each end of said rock frame a floating swingable outrigger frame, and
    pivot means for each outrigger frame pivoting and suspending the same adjacent the associated end of said rock frame for swinging about a swing axis substantially paralleling said rock axis, with the outrigger frame depending from the rock frame.

* * * * *